P. MILES.
Meat Mincer.

No. 43,520. Patented July 12, 1864.

Witnesses:
Lemuel W. Serrell
Thos. Geo. Harold

Inventor:
Purches Miles.

UNITED STATES PATENT OFFICE.

PURCHES MILES, OF NEW YORK, N. Y.

IMPROVED MEAT-MINCING MACHINE.

Specification forming part of Letters Patent No. 43,520, dated July 12, 1864.

*To all whom it may concern:*

Be it known that I, PURCHES MILES, of the city and State of New York, have invented, made, and applied to use a certain new and useful Improvement in Meat-Mincing Machines; and I do hereby declare the following to be a full, clear, and exact description of the said invention, reference being had to the annexed drawings, making part of this specification, wherein—

Figure 1:
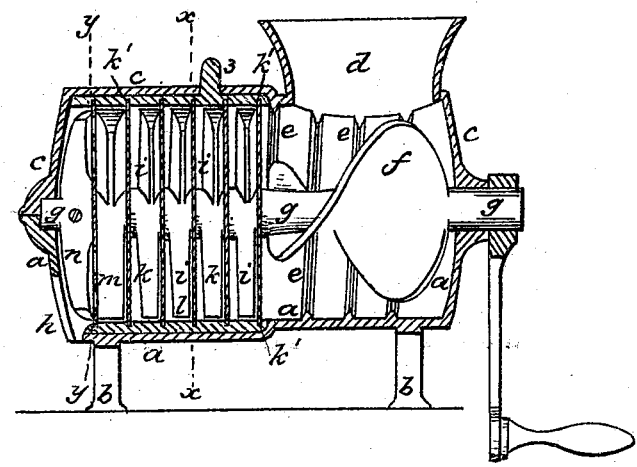
Figure 2:
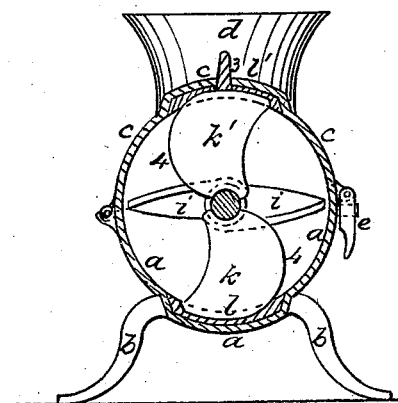
Figure 3:
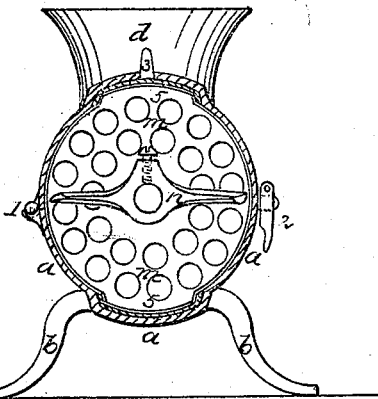

Figure 1 is a vertical section of my improved meat-mincing machine. Fig. 2 is a cross-section of the same at the line $x\ x$, and Fig. 3 is a similar view at the line $y\ y$.

The same letters refer to like parts.

My present invention is an improvement upon that for which Letters Patent were granted to me August 19, 1862. In that patent a series of beaters are set in a spiral form around a shaft and act to press the meat against stationary cutters with straight edges, and at the same time cause the gradual progression of the meat from the supply to the delivery end, and inclined wings also aided in this movement. In this pieces of meat might escape before sufficiently comminuted, and the beaters only acting to carry the meat against the cutters said cutters require to be very sharp or the meat will not be cut.

The nature of my present invention consists, first, in casting the shaft with a spiral feeding-wing and with a straight range of beaters or fingers, whereby the act of cutting the meat does not cause the delivery of such meat, and the same can remain in the cutting portion as long as desired until forced out by the introduction of an additional supply of meat, forced along by the spiral wing; second, in forming the cutting-edges of the knives curved, so as to produce a drawing cut on the meat and effect its separation by the revolving fingers more perfectly and easily; third, in constructing the fingers and cutters so that they act as shears to separate the meat, and the pressure of forcing the meat through the machine keeps the cutting-edges in contact, and they are so shaped that they require but little sharpening, as they continually sharpen themselves; fourth, in a perforated plate to detain the meat until reduced to the required size, so that no pieces can escape until properly reduced.

Figure 4:
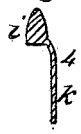

In the drawings, $a$ is the lower half of my cylinder on legs $b$; and $c$ is the upper half, united to $a$ by hook-hinges 1 and a clasp 2. $d$ is the hopper for receiving the meat. $e$ is a stationary spiral, cast in the inside of $a\ c$, to act in conjunction with the spiral wing $f$ on the shaft $g$, to force the meat along toward the delivery-opening $h$. $i\ i\ i$ is a series of fingers cast on the shaft $g$ in a line, or nearly so, with each other. Immediately adjoining the front edge of each of these fingers $i$ a groove is formed, receiving and supporting the ends of the stationary cutters $k\ k'$. These cutters $k\ k'$ are formed in ranges upon the respective plates $l\ l'$, the plate $l'$ having a guiding-stud, 3, that passes through a mortise in $c$, so as to steady said plate in its place while the apparatus is being shut up after having been opened for cleaning or otherwise. The cutting-edges 4 of these cutters $k\ k'$ are formed as a curve, so that the meat as pressed upon them by the fingers $i\ i$ will be exposed to a drawing cut, and said cutters hence will be much more efficient than they would be if straight. Each cutter is also a little dishing and formed with the cutting-edge on one side, as seen in Fig. 4, and the edge of the finger $i$ is also beveled back, so that a shear is produced by each finger $i$ and its contiguous cutters $k\ k'$, and the action of the meat against the spiral wing $f$ is to keep these cutting-edges in contact, and hence they sharpen themselves by wear, and require little or no attention. At the end of the meat-cutter, between the cutting device and the delivery-opening, I introduce a perforated plate or detainer, $m$, with holes or openings of a size adapted to pass the pieces of meat only when reduced to the desired size; hence the meat will remain in the mincer until properly comminuted. A clearer, $n$, attached to the shaft $g$, scrapes the meat off the said detainer as it passes through the holes. This detainer $m$ may be retained in place in any convenient manner, (I have shown projections at 5 5 for this purpose,) or it might revolve with the shaft and the scraper be stationary.

What I claim, and desire to secure by Letters Patent, is—

1. A straight range of fingers or beaters on a revolving shaft, in combination with stationary cutters and with a spiral wing to feed the meat to the cutters, whereby the delivery of the meat from the machine is dependent upon the introduction of additional material to be cut, as set forth.

2. A series of stationary knives formed with curved cutting-edges, as set forth, in combination with a series of fingers passing between such cutters, whereby the meat is separated with a drawing cut, as specified.

3. A perforated detainer applied to a meat-mincer, substantially as specified, to retain the meat until properly comminuted, as set forth.

In witness whereof I have hereunto set my signature this 14th day of June, 1864.

PURCHES MILES.

Witnesses:
 LEMUEL W. SERRELL,
 THOS. GEO. HAROLD.